Patented Dec. 13, 1949

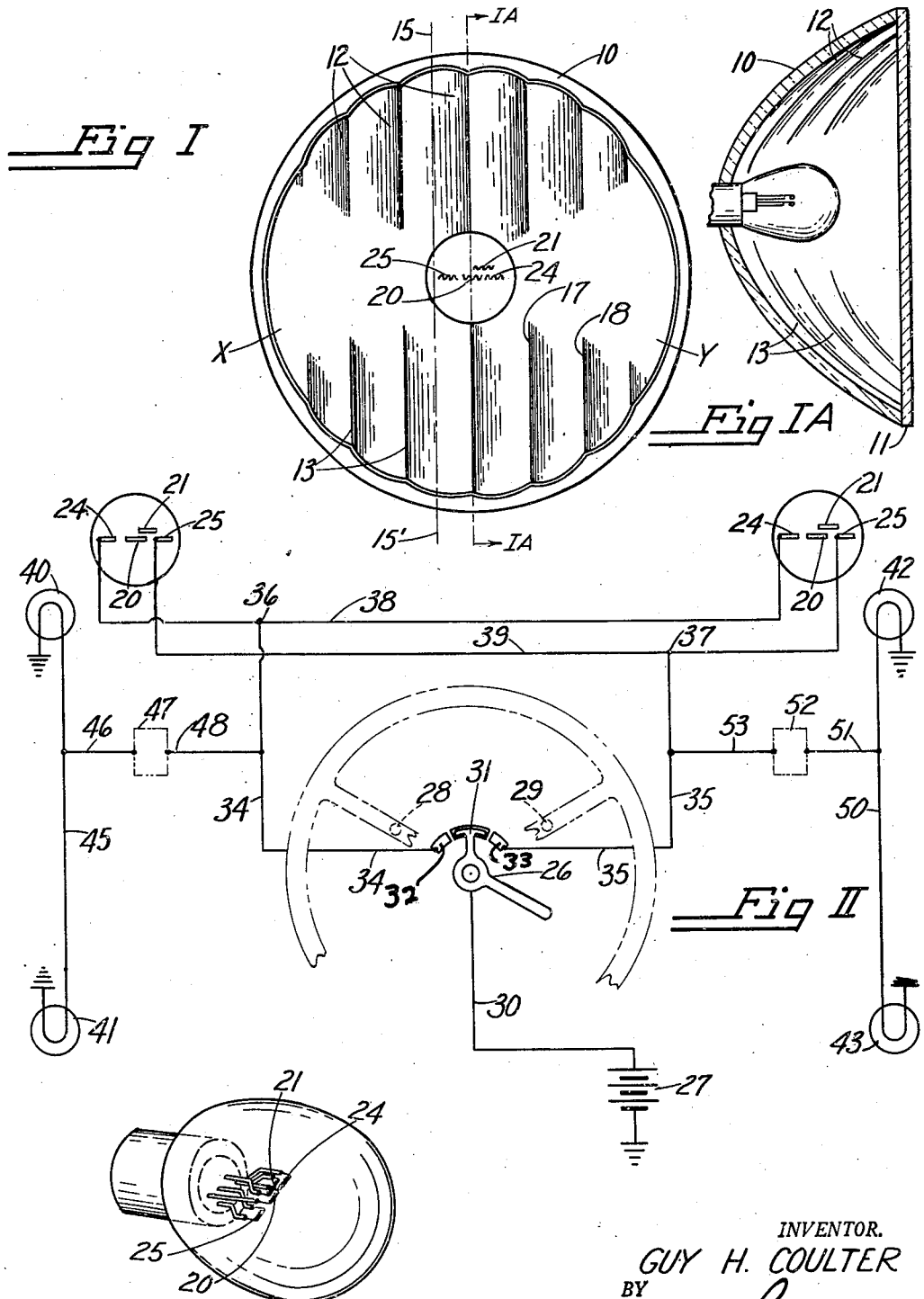

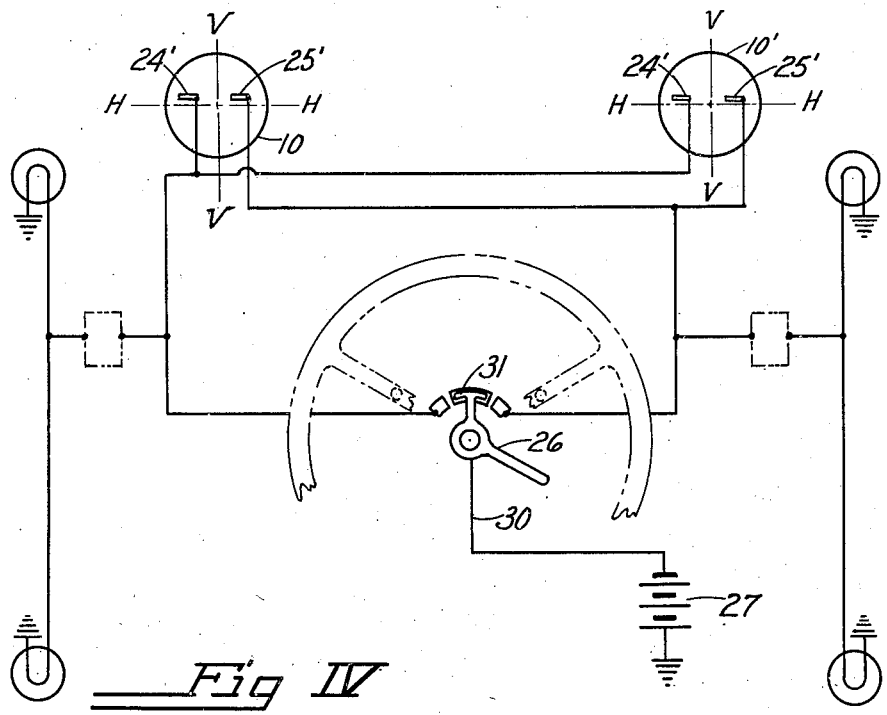
_Fig IV_
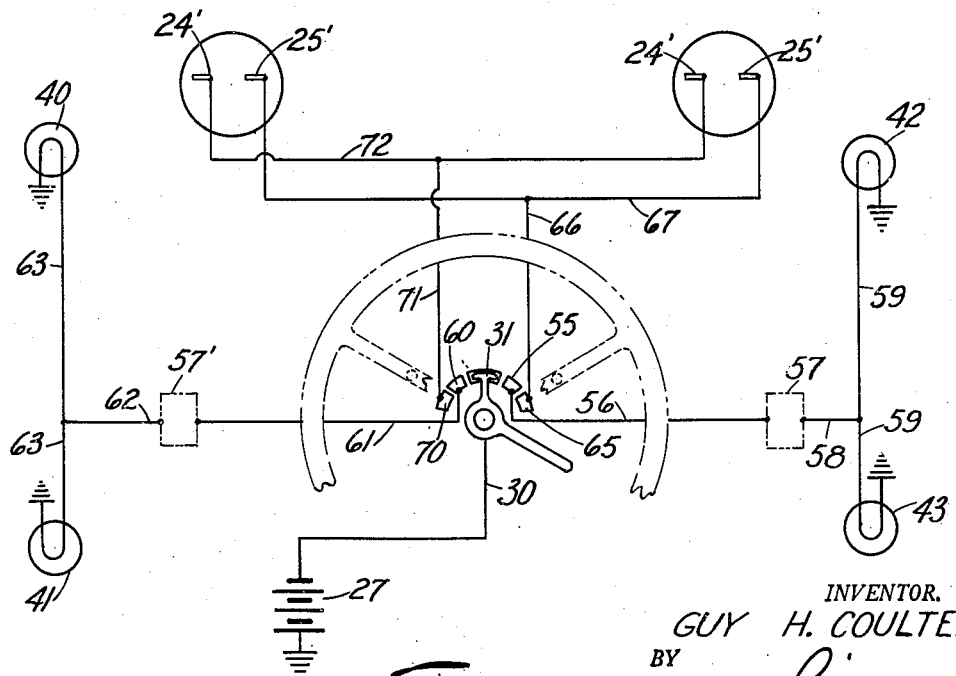
_Fig V_
INVENTOR.
GUY H. COULTER
BY Edmund B Whiteowl
ATTORNEY

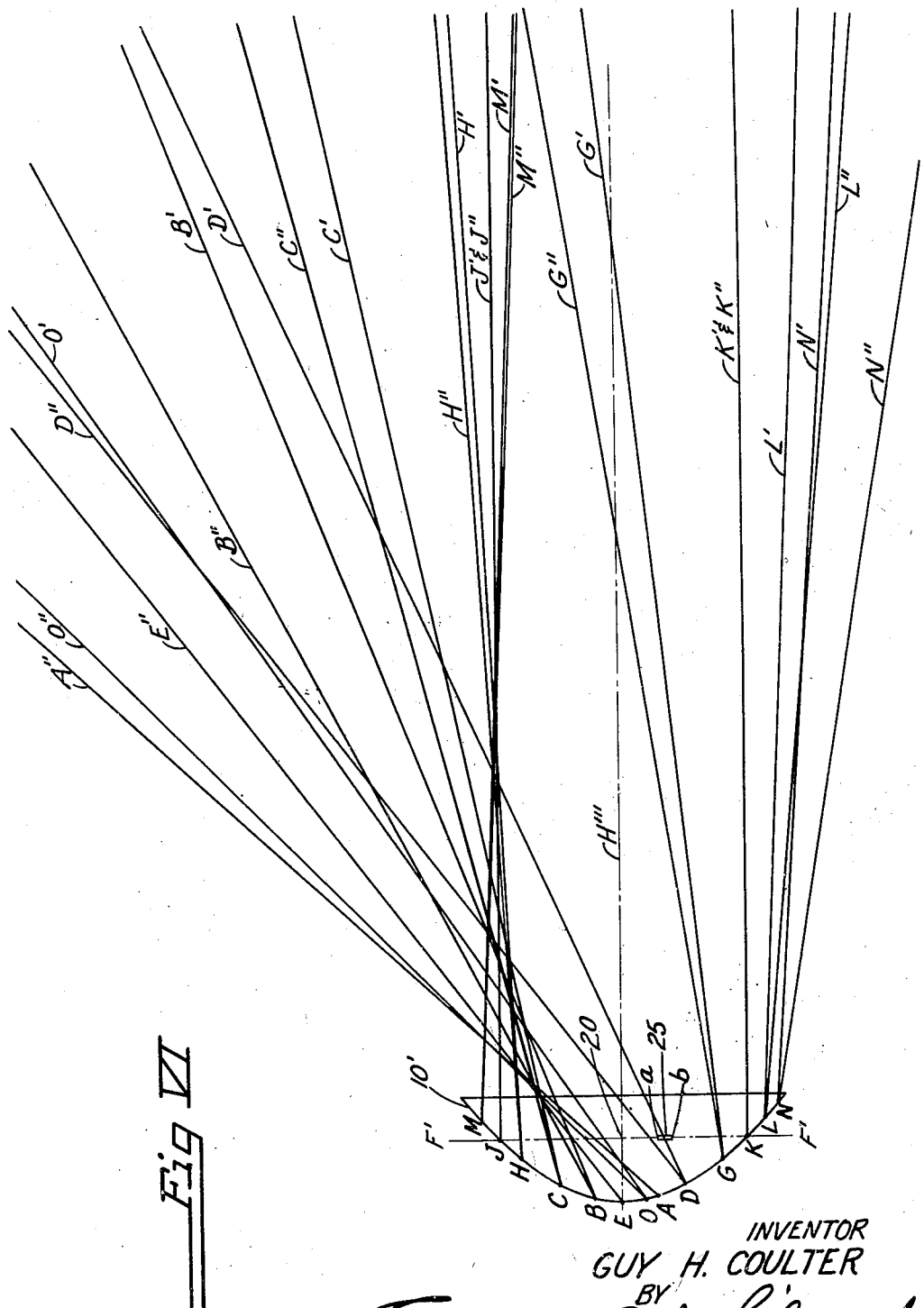
Fig VI

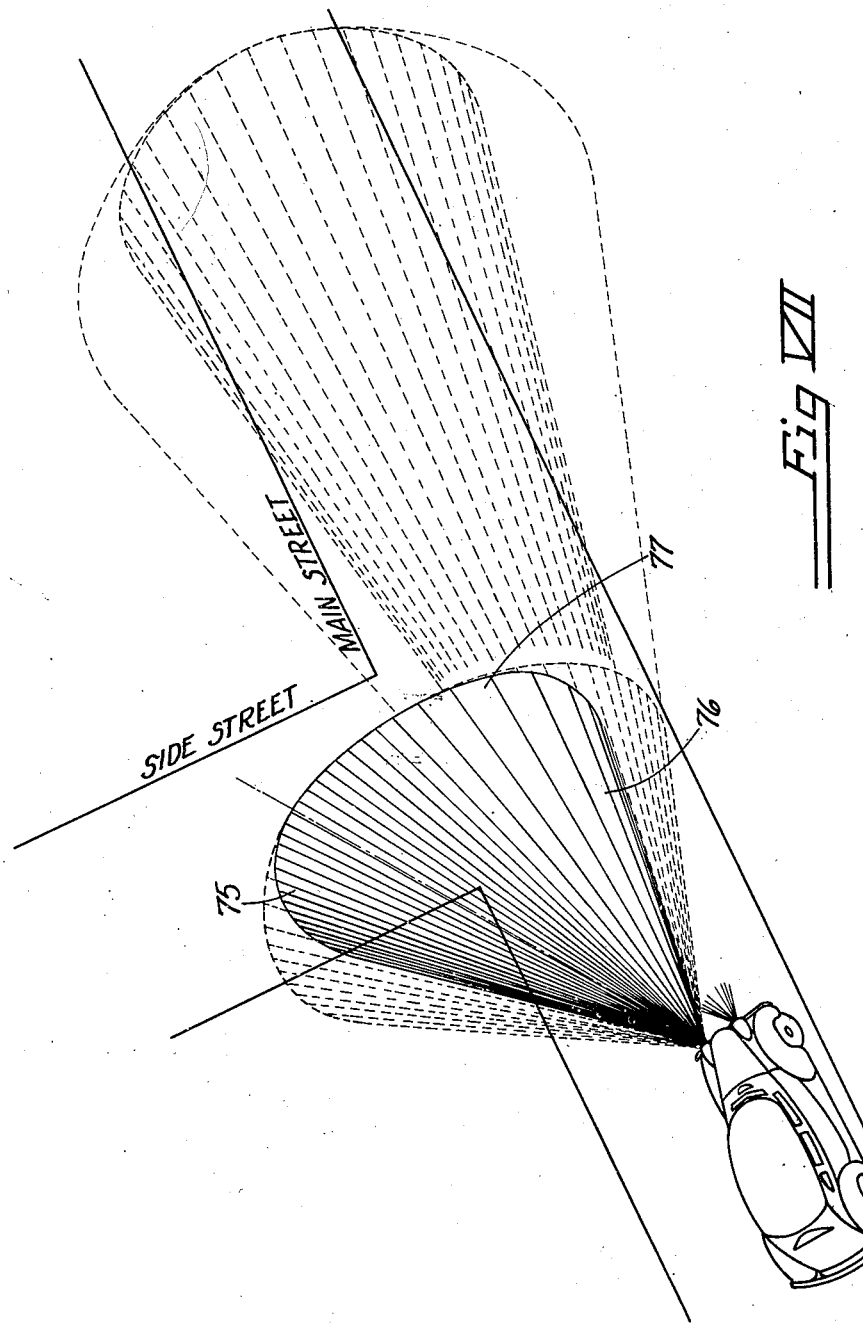

2,490,948

UNITED STATES PATENT OFFICE 2,490,948

HEAD LAMP CONSTRUCTION FOR RIGHT AND LEFT HAND TURNS AND DIRECTIONAL SIGNAL SYSTEM WITH CIRCUITS AND CONTROL MECHANISM THEREFOR

Guy H. Coulter, Detroit, Mich., assignor to United Lens Corporation, Detroit, Mich., a corporation of Delaware Application May 8, 1947, Serial No. 746,726

9 Claims. (Cl. 315—81)

1

This invention relates to headlamp constructions together with a combination of circuits and operating controls with pilot indicating means to indicate the proper operation of the mechanism, and is a continuation, in part, of my copending application, Serial No. 674,441, filed June 5, 1946, and my copending application, Patent #2,453,702, filed July 27, 1942, the invention contemplating means for projecting a satisfactory beam of light for the driver of a motor vehicle in turning curves in the country or making right hand and left hand turns in city streets.

One of the objects of the present invention is to provide a unique arrangement of filaments in an automobile headlamp so that the driver may, at will, energize filaments to give a beam pattern of light in rounding curves, either right hand or left hand, in the country and in making right hand left hand turns for city driving, and to accomplish this without requiring any moving parts other than the operation of the controlling switch by the driver. Moreover, by my arrangement, I am able to employ the ordinary headlamp arrangements for producing the normal driving beam and normal passing beam in which the component parts of the headlamp are provided with efficient and satisfactory means for facilitating the production of the required beams for normal driving in a cheap and economical manner, and by a construction which will avoid the formation of objectionable glare. Moreover, with my present arrangement of providing right hand and left hand turn beams, I utilize the same construction employed in producing the normal straight ahead beams, but which particularly cooperates with the means for producing the turn beams, particularly the lateral spreading and production of a particularly satisfactory result in actual use. For example, I employ a type of headlamp using the reflector which may extend forward of the focal plane, so proportioned with the part of the reflector in back of the focal plane that with my filament arrangements I am able to produce the beam patterns for turning in right hand and left hand directions in such a manner as to also provide a certain amount of light on the road in the opposite direction with a much reduced intensity in the connecting arrangement of the beam so that

2 when turning the vehicle in either direction, objectionable glare is eliminated for an oncoming vehicle but, at the same time, a desirable amount of light is thrown to distinguish objects on both sides of the street around the corner into which the vehicle is being guided.

Another object of my invention is to provide a combination headlight system and directional signal system in which a single switch control is employed for indicating a flashing directional signal and producing a turning beam pattern along the lines of the foregoing statements.

In certain embodiments of my invention, I have found that I can use a headlight construction in which the front cover glass may be plain, unfluted and therefore provide for a maximum efficiency of light transmission, while I obtain the spreading action for vertical flutes located in the reflector itself. I also use a polarized light front cover. Moreover, I contemplate using a headlight construction in which a separate "miniature" bulb is employed as well as one in which the entire unit constitutes a bulb in itself, the same being exhausted of air and constituting a combined bulb and headlight incorporating therein the arrangements above specified.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I illustrates a front elevation of one embodiment of my headlamp construction;

Figure II is a diagram viewed from the driver's seat showing the circuits for the filaments of the headlamp and also the combination with the flashing turn indicating system with single control.

Figure III is a perspective of the miniature bulb used in the embodiment illustrated in Figure I;

Figure IV is a diagrammatic illustration of a modification of my system used for producing right and left hand turn beam patterns from the headlamp in which the flashing turn indicator operates simultaneously with the headlamp beam pattern production;

Figure V is a diagrammatic view of a modification of the arrangement shown in Figure IV in which the turn indication is indicated prior to the production of the turning beams from the headlamps;

Figure VI is a diagrammatic view showing geometrically the projection of rays from the turn filament illustrated in my several embodiments;

Figure VII is a diagrammatic view showing the production of the beam pattern for straight-ahead driving and for left hand turning in a city street.

In one embodiment of my present invention, as is illustrated in Figures VIII to XI, of my first mentioned co-pending application supra, I employ in the upper half of the parabolic shaped, metal, glass, or molded plastic reflector 10, a series of curved flutes 12 convex in transverse configuration, while on the lower half the flutes 13 are reversed, and made concave—viewed from the front. Thus, as shown in Figures I and I—A, I use a fluted glass reflector 10 and a plain glass front cover 11 suitably sealed or otherwise joined at their meeting edges.

This "plain" glass cover, I also make up with a polarized light material associated therewith to further avoid glare. In this connection, it is important to note that although "polarizing" re- in front of the focal plane emanating from the passing filament 21, instead of passing to the right is directed toward the left. An important feature of my invention is an arrangement illustrated in Figure I where it is seen that the flutes 12 and 13 disappear at the central zone which fans out on both sides from the central part as indicated at X and Y. By eliminating the spreading effect at these particular sections, I have found that it is possible to get the overall desired passing beam pattern in which, while some of the light is thrown to the left, the omission of spreading flutes at these points X and Y not only cuts off the additional spread which would otherwise occur, but also cooperates in producing my special type of right hand and left hand "turning" beams. In this way, I obtain the desired beam pattern with the substantial effect of throwing the "effective" passing beam down and to the right as desired.

In the embodiment illustrated in Figures I to III, I employ two additional separately energizable, laterally disposed filaments 24 and 25, which are located substantially on the horizontal axis of the reflector 10 and may be connected by the operator through switch 26 with a source of energy 27 when the motor vehicle is turning to the right hand or to the left hand. As shown in Figures I and III, the main driving beam filament 20 is located as nearly exactly at the focus of the parabolic reflector 10 as is possible, while the filaconnected by lead 46, flasher 47 and lead 48 to lead 34. On the other side, lead 50 connects the two signals 42 and 43, and this lead 50 is in turn connected through lead 51, flasher 52 and lead 53 to lead 35. By this arrangement, the single switch 26 simultaneously controls both the directional signal system (filaments 40, 41 and 42, 43) and headlamp turn beam producting filaments 24 and 25.

Referring to the embodiment of my invention illustrated in Figure IV, here the main driving and passing filaments 20 and 21 of the headlamp 10 are not shown for the purpose of clearness, but the left hand and right hand turning filaments 24' and 25' are shown in this embodiment as spaced above the horizontal axis H—H shown in this figure. In the embodiment of Figure IV, therefore, the beam thrown to the left or to the right, or making a left or right hand turn is also thrown downwardly in each case and is intended for use in driving in congested areas and making turns in city streets. I have also discovered that the filament 25' for making a left hand turn should be much closer to the vertical line V—V than the right hand turn filament 24'. The farther the offset filament is removed from the vertical axis, the sharper the horizontal angle of direction projected by the headlamp. Since the vehicle is on the right hand side of the road, in order to make a left hand turn with substantially the same optical effective results as making the right hand turn, the right turn beam must be brought around more sharply to the right than in the case of the left beam. This arrangement is provided in the embodiment by my invention illustrated in Figure IV, where it will be seen that the left hand turn filament 25' is closer to the vertical V—V than the right hand turn filament 24' which gives a sharp angle to the direction of the beam to the right for making a right hand turn.

The circuits, in Figure IV, for energizing the filament of the single control lever 26 for operating both the headlamp turn beam projecting means and the directional signal flashing indicators is similar to that illustrated in Figure II, and therefore it is unnecessary to describe these circuits in connection with Figure IV.

In Figure V, a modification of the control of the two systems, i. e., the headlamp turn beam projectors on the one hand and the flashing directional signal indicators on the other hand is illustrated. Here, the directional indicating system is set in operation prior to an energization of the turn filaments in the headlamps, the same being controlled, however, from the single actuating switch 26. In the embodiment of Figure V, a source of electrical energy such as the battery 27 is shown as corresponding to that illustrated in Figure II and IV. Likewise, lead 30 connects the source of energy with the switch blade 31 which is movable to establish the various connections as follows:

A stationary terminal 55 is connected by lead 56 through flasher 57, lead 58, and a pair of branch leads 59 to the filaments of the right hand directional signal devices 42 and 43. On the left hand side, a stationary terminal 60 is connected by lead 61 through flasher 57', lead 62 to a pair of leads 63 connected with the filaments 40 and 41 of the left hand flashing turn signal device.

By turning the switch handle 26 one way or the other, it will be seen that first, i. e. before the turn headlamp beam filaments 24' and 25' are energized the directional signals are operated.

Thus, a connection is made from the source of energy 27 through lead 30, live switch blade 31, to stationary terminals 55 or 60 as the case may be, dependent on whether the handle 26 is turned for a right hand or a left hand signal indication. When a connection is made between a blade 31 and either of these terminals, the filaments will be accordingly energized.

In the embodiment of Figure V, upon turning the handle 26 an additional amount to the right hand or left hand, connections are subsequently made to energize the right hand and left hand turn filaments 24' and 25' arranged as indicated above in connection with the described embodiment of Figure IV. Thus, in Figure V, I have illustrated a stationary terminal 65 connected by lead 66 to a pair of leads 67 connected to the turn filament 25'. On the other side a stationary terminal 70 is connected by lead 71 to a pair of leads 72 connected with the other turn projecting filaments 24' of each of the headlights.

It will be noted that the elongated terminal 31' on the switch blade 31 is sufficient to bridge both contacts 55 and 65 on the right hand side and contacts 60 and 70 on the left hand side so that although the flashing directional indicating means may be first energized independently of the headlamp beam used in turning, yet when the handle 26 is turned further in either direction and the filaments 24' or 25' are energized, as above described, the extended switch blade terminal 31' bridges both contacts on either side so that the flashing directional turn signal is thereupon simultaneously energized.

In Figure VI, I have illustrated an accurately drawn projecting diagram for rays emanating from an offset source of energy such as the filament 25 with a geometrically correct parabola 10' drawn as accurately as possible, the parabola 10' representing the reflecting surface of portions of the reflector 10. The lines on the diagram of Figure VI were plotted in accordance with the law of optics of light reflection, i. e. that the angle of incidence equals the angle of reflection. Thus the "normal" for any point on the horizontal parabola 10' through focus 20' was ascertained by bisecting the angle between a line from the focus 20' to such point on the reflector 10' and a horizontal line parallel to the main horizontal axis H—C which a ray of light would take; according to the optical operation of a paraboloidal surface such as indicated at 10'.

Thus, the "normal" for any point such as at 0 on the parabola 10' was ascertained by bisecting the angle between a line drawn from the focus 20' and the forwardly projected horizontal line which is parallel to the main horizontal axis H''' of the reflector. According to the optical operation of a parabola, a ray of light emanating from a "point" source as at the exact focus F would be projected parallel with the axis of the reflector. Having ascertained the normal at point 0, then in order to ascertain where the rays would be projected from the offset filament 25 (for example) the following procedure was carried out in Figure VI: a series of lines were drawn from a pin point source of light assumed to be located at one end 25a of the bar reflector 25, while another series of lines were drawn as coming from a source of light located at the other extreme end 25b of said bar filament. In this way, I obtain an overall effect of the maximum and minimum angle of spread for the rays due to a horizontally arranged far offset filament 25. Specifically, a line was drawn from point 25a to point 0 and the angle ascertained between such line and the "normal" for point 0, said "normal" having been obtained as above specified. This is the angle of incidence. The angle of reflection was then measured off and the line 0' was drawn representing the ray of light projected from point I emanating from 25a.

The procedure was repeated as to point 25b at the other end of the bar filament and a line drawn from a point 25b to 0. The angle of incidence to the normal was ascertained and then the line 0" drawn on Figure VI.

A similar procedure was repeated for the several points A, B, C, D, G, and H, all located in the rear of the focal plane of the reflector represented by the line F'. In this way a fanning out of the light spread to the left is clearly indicated by the variation in the projected angle for the rays, as for example, from the ray G—G' which shows a relatively small amount of deflection to the ray A—A", which was diverted by a maximum angle to the left, as shown on the plot of Figure VI.

In my invention, I utilize an important and unusual phenomena in connection with ray projections from a parabola, namely, that for an offset filament such as the filament 25, the rays of light projected from that part of the reflector in front of the focal plane F' instead of being diverted toward the left (as in the case of the rays of light above referred to) these latter rays emanating from in front of the focal plane F' are diverted in an opposite direction, i. e., slightly to the right, while, of course, rays emanating from any point exactly on the intersection between the focal plane F' and the parabola 10' are projected horizontally and parallel to the axis H'''. I have specifically plotted points L, M, and N, which points are located in front of the focal plane F' and followed the procedure described above in locating the ray projection for the light from these particular points L, M and N. In this way, I found the line N—N" directed the most toward the right, while the other rays L—L', M—M', N—N', et cetera are also directed to the right but to a lesser degree.

Moreover, I arrange the focal length of the reflector compared to the diameter of the front opening that less angles of deflection and less total light flux is thus projected to the right in such instance—where the main flux is to the left for a left hand turn. As a result the area between these two extremes, the left hand and right end portion of the light pattern is of greatly reduced flux at this central area. For example, I have ascertained that between the ratios of one unit of focal length to eight for the diameter of the front opening of the parabola as one extreme and one unit focal length to four for such diameter of the front opening as the other extreme are satisfactory for the purposes of my invention, but preferably nearer the one to four ratio than the one to eight ratio. The dotted lines in Figure VII associated with the left hand turn projected beam indicate the added effect obtained by the spreading flutes 12 and 13 of the reflector.

An important feature of my invention is the fact that I utilize, as stated above, this unusual feature in a paraboloidal headlamp that while the main light flux is diverted to one side (as at 75 in Figure VII), nevertheless a substantial amount is projected to the opposite side in producing beams of light from filaments located substantially off the mathematical focus of the paraboloid. Figure VII illustrates this more fully. The main portion of, or a certain amount of the light flux shown as at 75, goes to the left and forms the main portion of the left turn pattern while that portion 76 emanating from that portion of the paraboloid in front of the focal plane F', when the offset filament 25 is energized instead of being sharply projected toward the left as at 75 is slightly projected toward the right as at 76 and is of less flux than at 75. The total available light flux in the entire beam pattern is thinned out at the central area 77 of the pattern connecting that portion of the main turning beam 75 which is thrown to the left. In view of the fact that an oncoming automobile would be approaching into this zone (area 77) and the light intensity in this area 77 is greatly reduced, the glare in the eyes of the oncoming driver is thereby substantially eliminated.

In connection with the safety feature of my invention, assuming the condition of making a left hand curve on the country driving, if there is no approaching car on the curve, then the operator would use the shift over beam for the left hand turn. However, if there is an oncoming car around the curve, the other car would light up the roadway on that side, it would be unnecessary for the driver to throw on his curve-turn beam when the curve is to the left.

If the curve is to the right, the operator would use it with no problem of turning his headlights into the oncoming driver's eyes because the operator would be turning the beam pattern clear around to the right and this would correspond to using the depressed beam, broadly, in so far as avoiding glare in the eyes of the oncoming driver is concerned. There would be less glare on the right hand turn because the total amount of flux differs compared with the straight way beam from the filament at focus, namely, the part of the light from the rear of the focal plane is pulled around to the right, whereas some of the other light in front of the focal plane goes almost straight ahead and is pulled over to the left slightly, but the light intensity by this action is reduced which tends to reduce the objectionable glare.

What I claim is:

1. In a combined vehicle headlight and directional signalling system; a pair of headlights; a plurality of extra filaments in said headlight; means for projecting a beam pattern of light from said headlights to the right or left side of the vehicle controlled by the operator by completing an energizing circuit to one or the other of said extra filaments; a pair of right turn directional signals; a pair of left turn directional signals; circuits therefor, a part of the energizing circuits for both said headlights and directional signals being common one to the other; and single switching means for simultaneously controlling both said circuits for said headlights and said directional signals.

2. In a combined vehicle headlight and directional signalling system; a pair of headlights; a plurality of extra filaments in said headlight; means for projecting a beam pattern of light from said headlights to the right or left side of the vehicle controlled by the operator by completing an energizing circuit to one or the other of said extra filaments; a pair of right turn directional signals; a pair of left turn directional signals; circuits therefor, a part of the energizing circuits for both said headlights and directional signals being common one to the other; and single switching means for simultaneously controlling both said circuits for said headlights and said directional signals.

3. In a combined vehicle headlight and directional signalling system, a pair of headlights; an extra filament in said headlight for projecting a right hand directed beam of light; an extra filament in said headlight for projecting a left hand directed beam of light; circuits for energizing said extra filaments independently of each other and from the normal filaments of said headlights; a right turn directional signal; a left turn directional signal; energizing circuits for said directional signals; and a unitary switching means for controlling the energization of both of said headlight filaments and said directional signals, said switching means arranged to energize both systems simultaneously or said headlight filaments independently of said directional signals.

4. In a combined vehicle headlight and directional signalling system, a pair of headlights; an extra filament in one headlight for projecting a right hand directed beam of light; an extra filament in a headlight for projecting a left hand directed beam of light; a source of electrical energy; circuits therefrom for energizing said extra filaments independently of each other; a right turn directional signal; a left turn directional signal; energizing circuits between said source and said directional signals; and manually settable unitary switching means for controlling the energization of both of said headlight filaments and said directional signals, said switching means arranged to energize both systems simultaneously or said directional turn filaments independently of said extra headlight filaments.

5. In an automotive vehicle, a combined headlight and directional illuminating system, a pair of headlights having right hand and left hand beam illuminating projecting filaments; a right turn illuminating directional signal and a left turn illuminating directional signal; a source of electrical energy; a single pole double throw switch; a lead from said source of energy to said switch pole; a plurality of switch terminals, one adapted to be connected with said right hand and another to the left hand illuminating means; separate leads from said right and left hand terminals to said right hand and left hand beam projecting headlight filaments; and leads from said last mentioned right hand and left hand headlight leads to said right and left hand directional signal illuminating means.

6. In an automotive vehicle, a combined headlight and directional illuminating system, a pair of headlights having right hand and left hand illuminating beam projecting filaments; a right turn illuminating directional signal and a left turn illuminating directional signal; a source of electrical energy; a single pole, double throw manually settable switch; a lead from said source of energy to said switch pole; a plurality of switch terminals, one adapted to be connected with said right hand and another to the left hand illuminating means; separate leads from said right and left hand terminals to said right hand and left hand beam projecting headlight filaments; leads from said last mentioned right hand and left hand headlight leads to said right and left hand directional signal illuminating means; and automatic means to return said switch to neutral "off" position when said vehicle has completed said turn.

7. In a combined headlamp and directional signal illuminating system for motor vehicles the combination of a pair of headlamps having a concave reflector and main driving beam and passing beam filaments located adjacent the focus of said reflector in said headlamps; each headlamp having a right-hand and a left-hand beam projecting filament located substantially in the focal plane of said reflector, and each of said last-mentioned filaments horizontally offset from the focal point of said reflector; a right turn directional signal and a left turn directional signal; a source of electrical energy; a single unitary switch for controlling energization of both a directional signal and a corresponding right or left-hand beam projecting filament in pairs; a common lead extending from said source of energy to said single control switch; a pair of common leads extending from said switch to the right side of said vehicle and to the left side of said vehicle; parallel leads extending from one of said last-mentioned leads to the directional signals on the right-hand side of the vehicle and the filaments in said headlamps for projecting the right turn beam and parallel circuits on the left-hand side of the vehicle from the other of said common leads to the directional signals on the left side of the vehicle and to the left turn beam projecting filaments in both of said headlamps.

8. In a combined headlamp and directional illuminating system for motor vehicles, the combination of a pair of headlamps each having a concave reflector therein and provided with driving beam and passing beam filaments, one of said filaments located at the focus of said reflector and the other laterally offset and above said focus to project a passing beam toward the right side of the road; each headlamp having a right-hand and a left-hand turn beam filament located substantially in the focal plane of the reflector, and each of said last-mentioned filaments being horizontally arranged and located a substantial distance, one to the right side and the other to the left side of the vertical plane through the focus of said reflector, each of said last-mentioned filaments being also offset above the horizontal plane through said focus; a pair of directional indicating signals located at the rear of said vehicle, one for indicating a left-hand turn and the other for a right-hand turn; a control switch; a source of electrical energy connected to said switch; a pair of leads extending from said switch to the right side of said vehicle and to the left side of said vehicle; parallel connections extending from one of said last-mentioned leads to the directional signals on the right-hand side of the vehicle and to both of the filaments in said headlamps for projecting the right turn beam; and parallel circuits on the left-hand side of the vehicle from the other of said leads to the directional signals on the left side of the vehicle and to the left turn beam projecting filaments in both of said headlamps; said control switch comprising a single means for energization of both a right or left-hand directional signal and a corresponding right or left-hand beam projecting filament in pairs.

9. In a combined headlamp and directional illuminating system for motor vehicles, the combination of a pair of headlamps each having a concave reflector therein and provided with driving beam and passing beam filaments, one of said filaments located at the focus of said reflector and the other laterally offset and above said focus to project a passing beam toward the right side of the road; each headlamp having a right-hand and a left-hand turn beam filament located substantially in the focal plane of the reflector, and each of said last-mentioned filaments being horizontally arranged and located a substantial distance, one to the right side and the other to the left side of the vertical plane through the focus of said reflector; a pair of directional indicating flashing signals, one for indicating a left-hand turn and the other for a right-hand turn; a control switch; a source of electrical energy connected to said switch; a pair of leads extending from said switch to the right side of said vehicle and to the left side of said vehicle; parallel connections extending from one of said last-mentioned leads to the directional signals on the right-hand side of the vehicle and to both of the filaments in said headlamps for simultaneously projecting the right turn beam; and parallel circuits on the left-hand side of the vehicle from the other of said leads to the directional signals on the left side of the vehicle and to the left turn beam projecting filaments in both of said headlamps for simultaneously projecting the left turn beam; said control switch comprising a single means for energization of both a right or left-hand directional signal and a corresponding right or left-hand beam projecting filament in pairs.

GUY H. COULTER.

REFERENCES CITED

The following references are of record in the file of this patent:

UNITED STATES PATENTS

| Number | Name | Date |
| --- | --- | --- |
| 1,795,614 | Morgan | Mar. 10, 1931 |
| 1,843,825 | Lewis | Feb. 2, 1932 |
| 1,954,075 | Flage | Apr. 10, 1934 |
| 2,037,863 | Matha | Apr. 21, 1936 |
| 2,064,735 | Curtiss | Dec. 15, 1936 |
| 2,120,870 | Roper | June 14, 1938 |
| 2,131,634 | Michel, et al. | Sept. 27, 1938 |
| 2,146,593 | Roper | Feb. 7, 1939 |